Aug. 2, 1966  H. GANG  3,263,917
NORMALIZING MEANS FOR CALCULATING MACHINES
Filed June 29, 1964  4 Sheets-Sheet 1
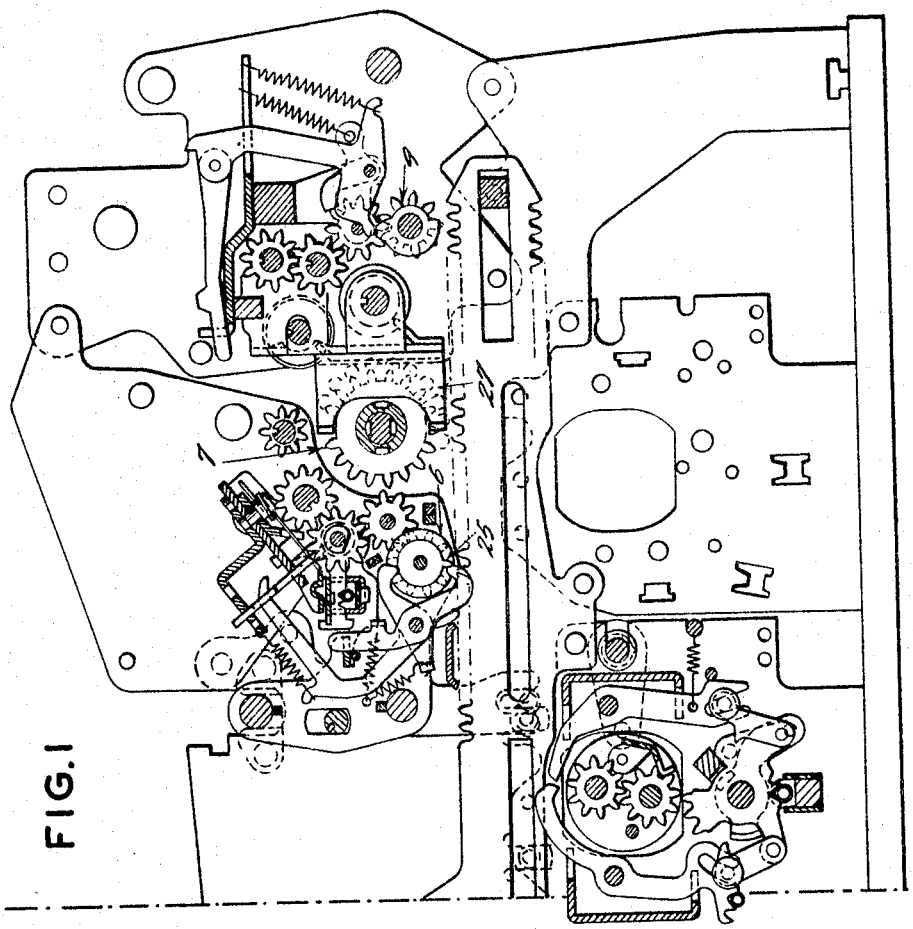
INVENTOR.
HERMAN GANG
BY
ATTORNEY Aug. 2, 1966     H. GANG     3,263,917
NORMALIZING MEANS FOR CALCULATING MACHINES
Filed June 29, 1964     4 Sheets-Sheet 2
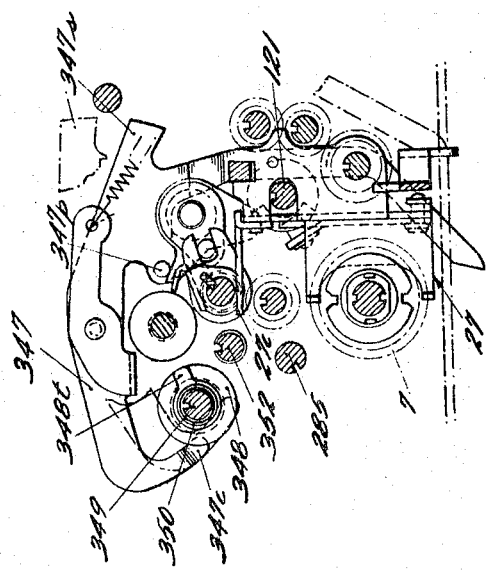
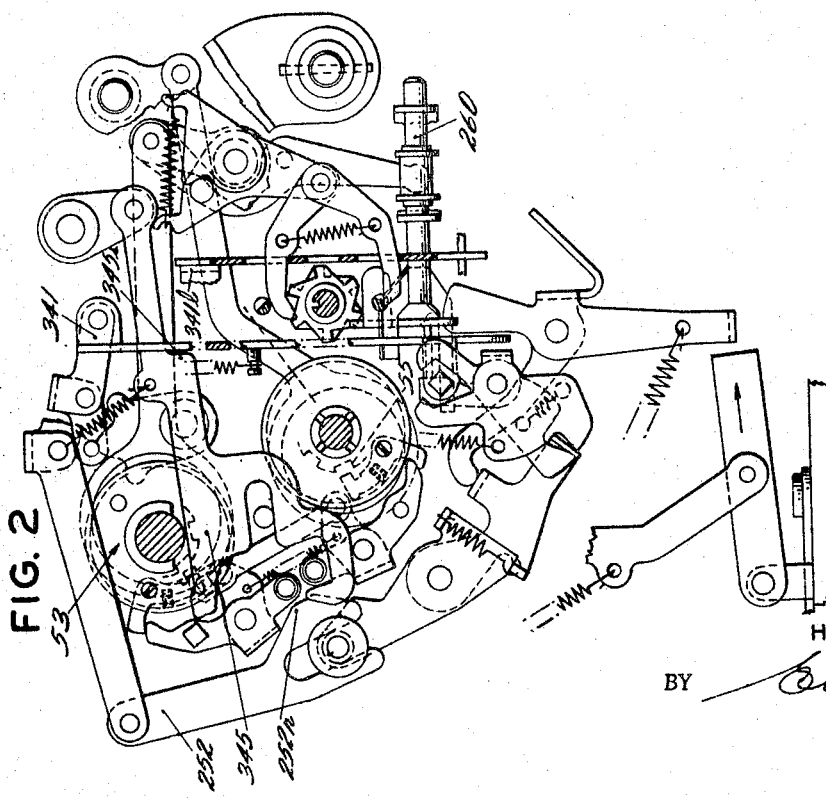
INVENTOR.
HERMAN GANG
BY George V. Hall
ATTORNEY Aug. 2, 1966   H. GANG   3,263,917

NORMALIZING MEANS FOR CALCULATING MACHINES

Filed June 29, 1964   4 Sheets-Sheet 3

INVENTOR.
HERMAN GANG

BY *[signature]*

ATTORNEY

Aug. 2, 1966 H. GANG 3,263,917
NORMALIZING MEANS FOR CALCULATING MACHINES
Filed June 29, 1964 4 Sheets-Sheet 4
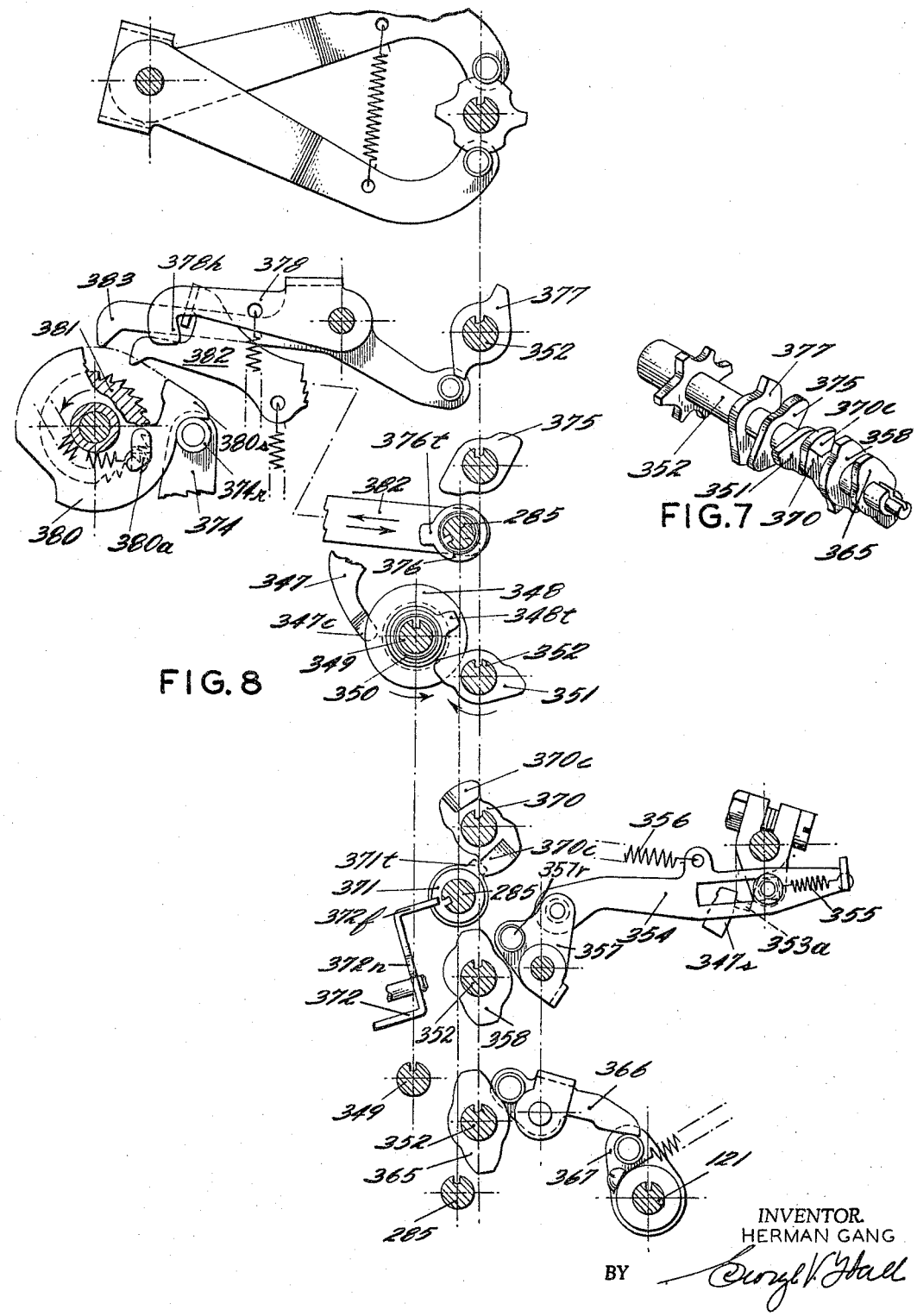
INVENTOR.
HERMAN GANG
BY
ATTORNEY

United States Patent Office 3,263,917
Patented August 2, 1966

3,263,917
NORMALIZING MEANS FOR CALCULATING MACHINES
Herman Gang, Morris Plains, N.J., assignor to Monroe International Corporation, Orange, N.J., a corporation of Delaware
Filed June 29, 1964, Ser. No. 378,537
11 Claims. (Cl. 235—60.41)

This invention relates to normalizing means for calculating machines wherein the machine parts are restored to normal positions at the conclusion of a calculation including a program of operations. If the program of operations is not completed, in such a machine, the parts would not be normalized and it would be necessary to normalize the machine by other means before another program could be instituted.

It is therefore the principal object of the invention to provide means for automatically normalizing a calculating machine if the machine is not normalized because of failure to complete a program of operations.

A more specific object is to normalize the machine by completing a program of operations upon failure of means normally effective to control operation of the program means.

A still more specific object is to complete a program of division upon failure of the normally operable program control means.

The machine in which the devices of the invention are herein disclosed, performs division by the well-known subtract, add and shift method. Digital actuators for a dividend register and in which a divisor is entered are mounted in a carriage which is normally in a right end position. In response to depression of an equals (=) key, the carriage is shifted to left end position and then the program of subtract, add, and right shift is instituted. This program is continued until the carriage is restored to right end position where the lowest order quotient digit is computed and the program is terminated with the parts normalized.

Subtractive registration is terminated in the usual manner in each ordinal position of the carriage when an overdraft occurs in the dividend register. Obviously if a division program is initiated without first entering a divisor in the digital actuators, an overdraft will not occur and the registering mechanism will continue indefinitely in subtractive operation. The machine could be stopped by disconnecting it from the power source; however, the parts would not be normalized. The present invention therefore provides means to continue the program of operations upon failure of the normally operable program control means for the above reason or because of mechanical failure.

The invention is disclosed as embodied in the machine of applicant's copending application Serial No. 364,621, filed May 4, 1964, which discloses but does not claim the present invention and to which reference is made for a complete disclosure of mechanism and operations referred to herein and not disclosed in detail. In the following description with reference to the accompanying drawings, parts corresponding to parts disclosed in said application are identified by like reference numerals.

In the drawings:

FIG. 1 is a longitudinal section through a part of the machine including the dividend register, the shiftable digital actuators for the register, and the quotient register.

FIG. 2 is a detail right side elevation of the registration and shift clutches, control means therefor, and shift direction control means.

FIG. 3 is a detail section, looking toward the left, of control devices for the division program means.

FIG. 7 is a perspective view of the program shaft including means for controlling the sequential registering and shift operations.

FIG. 8 is a mechanical schematic including the program shaft of FIG. 7 and associated mechanism.

*Division program control means*

Figure 5:
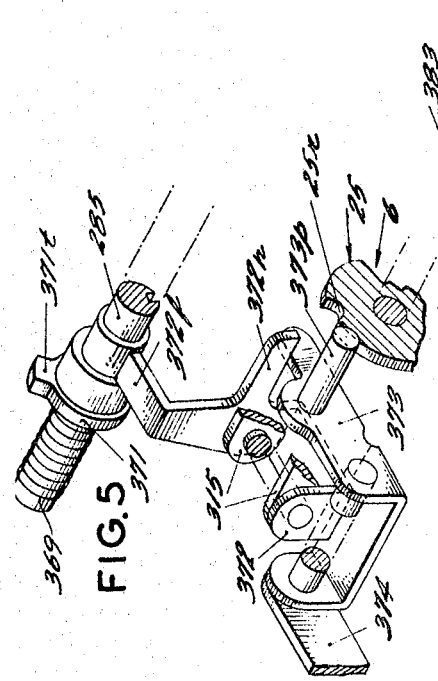
FIG. 5 is an exploded perspective view of the overdraft sensing means.

A dividend is entered in a nonshiftable register 6 (FIG. 1) and a divisor is entered in a digital actuator unit 7 which is mounted in a carriage 27 which, as previously noted, is normally in a right end position.

Actuator unit 7 is unidirectionally driven by a registration clutch 55 (FIG. 2), and is adjustable by sign control means for additive registration of the value entered therein or for additive registration of the complement of said value thereby performing subtraction.

A clutch 53 drives mechanism for ordinally shifting actuator carriage 27 with respect to register 6, and shift direction control means is operable to adjust the shifting mechanism for right or left shift operation.

Figure 4:
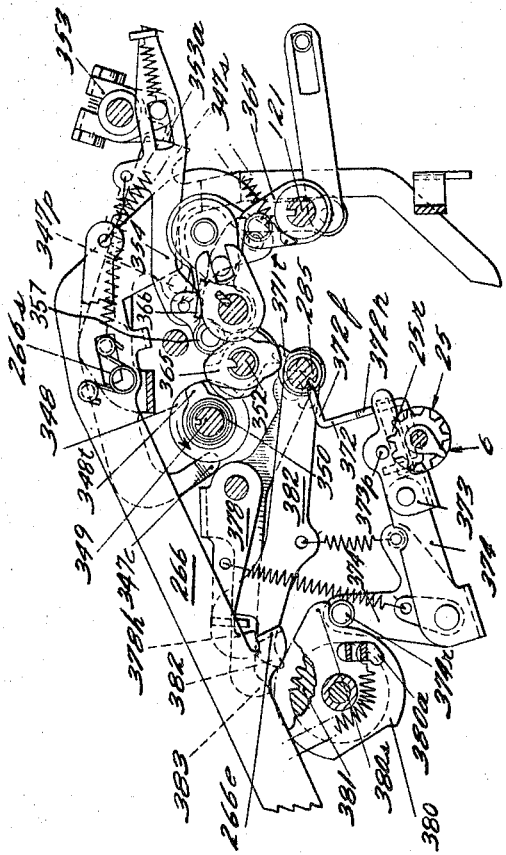
FIG. 4 is a right side detail view of program control devices, the overdraft sensing means, and superseding program control devices.

In response to depression of an equals key (not shown), certain program control devices are set and a program of division is initiated. The program control devices include a lever 347 (FIGS. 3, 4, 8) which is set counterclockwise to the dot-dash position of FIG. 3. Lever 347 includes a cam nose 347c which engages the left inclined face of a disc 348 which includes a driving tooth 348t and which is splined for axial adjustment adjacent the left end of a shaft 349 which extends across the machine and is driven directly by the driven member of shift clutch 53.

Normally disc 348 is held to the left in a disabled position by a spring 350 and upon each cycle of shift clutch 53, tooth 348t will be idly operable with respect to a cam wheel 351 (FIGS. 7, 8) fast on a program shaft 352. However, when lever 347 is rocked counterclockwise, cam nose 347c will move disc 348 to the right so that cam wheel 351 will be in the path of tooth 348t.

Means on program shaft 352 is operable to control the program of subtract, add and shift to register a quotient in a register 9 (FIG. 1). Means mounted on the program shaft and devices operable therewith will be described from right to left with reference particularly to FIGS. 7 and 8.

Means for controlling the sign of registration in dividend register 6 and quotient register 9 includes a cam wheel 365 fast on shaft 352 and having a pair of opposed lobes and a pair of opposed low parts. A cam follower 366 normally engages a low part of the cam wheel and includes an arm which engages a roller at the end of a crank 367 which is spring urged clockwise and is fast on a shaft 121. When follower 366 engages a low part of a cam wheel 365, crank 367 and shaft 121 will be in normal clockwise position with actuator unit 7 (FIG. 1) adjusted for additive registration and counting means for quotient register 9 adjusted for subtractive registration.

Program shaft 352 is adapted to be rotated, as later described, three 60° steps of clockwise movements in each of a series of control operations. Each series of operations controls the subtract, add and shift sequence of operations in the program of quotient registration. Shaft 352 therefore is rotated one-half turn for each series of operations. It will be noted that the cam means on the shaft are symmetrical, and therefore one-half turn of shaft 352 will bring the cam means into position to repeat their operations.

The first step of shaft 352 will engage a lobe of cam wheel 365 with follower 366 to rock said follower clockwise. This will rock crank 367 and shaft 121 counterclockwise to adjust actuator unit 7 for subtractive registration in dividend register 6 and the counting means for additive count in quotient register 9.

The second step of shaft 352 will engage a low part of cam wheel 365 with follower 366 and the parts will therefore be restored to provide for additive registration in dividend register 6 and subtractive count in quotient register 9.

During the third step of shaft 352, follower 366 will dwell on the low part of cam wheel 365. However, with the parts in this position registration clutch 55 (FIG. 2) will be disengaged and shift clutch 53 will be engaged as will appear.

Means for controlling a ram 345 (FIG. 2) to effect alternate engagement and disengagement of shift and registration clutches 53, 55 includes a cam wheel 358 fast on shaft 352. Cam wheel 358 includes a pair of opposed lobes, a pair of intermediate portions and a pair of opposed low portions.

Prior to operation of program shaft 352, a cam follower 357 is moved from an intermediate position by a spring 356 to engagement with a low part of cam wheel 358. In this operation, a push-pull link 354 is moved forwardly thereby moving ram 345 forwardly to engage shift clutch 53. If link 354 is moved rearwardly past intermediate position, ram 345 will disengage shift clutch 53 and engage registration clutch 55.

The first step of program shaft 352 will engage a lobe of cam wheel 358 with follower 357 thereby moving link 354 rearwardly to engage registration clutch 55 and disengage shift clutch 53. At this time, the sign control means, as previously described, will be adjusted for subtractive registration in dividend register 6 and additive count in quotient register 9.

The second step of program shaft 352 will engage an intermediate part of cam wheel 358 with follower 357. This will permit link 354 to be moved forwardly but not sufficiently to disengage registration clutch 55 and engage shift clutch 53. This operation is provided in consideration of timing to provide for subsequent rapid disengagement of registration clutch 55 and engagement of shift clutch 53. At this time, as previously discribed, the sign control means will be adjusted for additive registration in dividend register 6 and subtractive count in quotient register 9.

The third step of program shaft 352 will engage a low part of cam wheel 358 with follower 357. This will permit link 354 to be moved further forwardly to disengage registration clutch 55 and engage shift clutch 53. At this time, as previously described, the adjustment of the sign control means will not be changed.

Means driven by shift clutch 53 and by registration clutch 55 are operable to step program shaft 352.

A cam wheel 370 fast on program shaft 352 is operable by means driven by registration clutch 55. This means, however, is not operable until program shaft 352 is given its first step by means of shift clutch 53 which means therefore will be described first.

The means driven by shift clutch 53 comprises the previously noted cam wheel 351 fast on shaft 352. Cam wheel 351 has a pair of opposed lobes and is adapted to be driven by tooth 348t of cam disc 348 which, as previously described, is splined for axial adjustment on shaft 349 which is driven by the member of shift clutch 53. Cam disc 348 has been described as adjusted by lever 347 of the program setting means, from an idly operable position, toward the right to a position wherein tooth 348t is in the plane of cam wheel 351.

Near the end of a cycle of shift clutch 53, tooth 348t will engage a lobe of cam wheel 351 and rotate program shaft 352 its first step of movement for subtractive registration in dividend register 6 and additive count in quotient register 9. Cam wheel 351 then will be out of the path of tooth 348t but will be rotated to position to be engaged again by tooth 348t after shaft 352 is given its third step of movement.

Means operable by registration clutch 55 subsequent to an overdraft of dividend register 6 is operable to give program shaft 352 its second step of movement for additive registration in register 6 and subtractive count in register 9. This means comprises cam wheel 370 on shaft 352. Cam wheel 370 includes a pair of opposed lobes and is adapted to be engaged by a tooth 371t of a disc 371 (FIGS. 4, 5, 8) which is splined for axial adjustment on a shaft 285 driven at a one-to-one ratio with the output shaft of registration clutch 55

Disc 371 is urged to the right on shaft 285 by a spring 369 but is normally held to the left with tooth 371t out of the plane of the lobes of cam wheel 370 by an upstanding finger 372f of a rocker 372. Rocker 372 is mounted on a longitudinal short shaft which is supported in a fixed bracket 315 (FIG. 5) a short distance to the left of the highest order wheel 25 of dividend register 6.

Rocker 372 is provided with a rightwardly extending nose 372n which overlies the rear end of a longitudinal arm 373 which is pivotally mounted at its front to the rear end of a lower arm of a bell crank 374. Bell crank 374 remains stationary in the normal operation of the machine and is operated only in connection with the operation of the normalizing means of the present invention as later described.

Arm 373 is located immediately to the left of the highest order wheel 25 of dividend register 6, and a pin 373p intermediate the ends of the arm rests upon the periphery of said wheel. With the parts in the above normal position, the rear end of arm 373 will be raised and, by engagement with nose 372n will hold rocker 372 counterclockwise and finger 372f toward the left as viewed from the front of the machine. Accordingly, finger 372f will normally hold disc 371 to the left with tooth 371t out of the plane of the lobes of cam wheel 370.

In subtraction by complemental additive registration, the highest order wheel of register 6 is moved to "9" registering position during digital registration. If there is no overdraft during the current cycle, the wheel will be moved to "0" registering position by a tens transfer operation before the end of the cycle. If, however, there is an overdraft, there will be no tens transfer and the wheel will remain at "9" registering position. When this occurs, a recess 25r in the periphery of the wheel will be moved into and remain in registration with pin 373p to permit the rear end of arm 373 to be lowered from nose 372n. This will release rocker 372 for clockwise movement and therefore spring 369 will be effective to move disc 371 toward the right and tooth 371t into the plane of the lobes of cam wheel 370.

The previously described first 60° step of movement of program shaft 352 rotates cam wheel 370 to a position wherein a lobe thereof is in the rotary path of tooth 371t of disc 371 when said disc is adjusted to the right to locate the tooth in the plane of the lobes. During the terminal part of an overdraft cycle and the idle phase at the beginning of the following cycle, tooth 371t will engage a lobe of cam wheel 370 and rotate program shaft 352 the second 60° step. As previously described in the second step of the program shaft, registration clutch 55 will remain engaged but the sign of registration in dividend register 6 and quotient register 9 will be reversed, and therefore the overdraft will be corrected during said following cycle. Also rocker 372 will restore disc 371 to the left when the highest order wheel 25 is moved from "9" registering position in the overdraft correction.

It will be noted that each lobe of cam wheel 370 includes a cam wing 370c extending clockwise toward the right. Wings 370c are not operable in a normal division program, but are operable in connecting with the normalizing means of the invention later described.

Program shaft 352 will be given the third 60° step near the end of the above-described corrective registering cycle during which time tens transfer registration occurs. The means for giving program shaft 352 the third step includes a cam wheel 375 fast on said shaft and having a pair of opposed lobes. A disc 376 fast on the shaft 285 includes a tooth 376t rotating in the plane of the lobes of cam wheel 375 and which lobes are normally out of the path of said tooth. The two previously described 60° steps of shaft 352 will bring a lobe of cam wheel 375 into the rotary path of tooth 376t which will engage said lobe during the tens transfer phase of the corrective registering cycle and give said shaft the third 60° step. As a result, shift clutch 53 will be engaged, as described, and registration clutch 55 will be disengaged at the end of the cycle. Furthermore, program shaft 352 will be in position to begin another series of operations during the ensuing cycle of shift clutch 53.

A cam wheel 377 is fast on shaft 352 and has a pair of opposed lobes. When shaft 352 is in normal position a lobe of cam wheel 377 engages the rear end of a spring urged follower comprising a lever 378 (FIGS. 4, 8) which terminates at its front in a hook end 378h.

The first step of shaft 352 will move the lobe of cam wheel 377 from engagement with follower 378 which will then be rocked counterlockwise to lower hook 378h in front of an ear 266e of a rearwardly adjusted slide 266. This will maintain slide 266 in rearward position, for a purpose later described, after the slide is released when lever 347 is restored. When program shaft 352 completes each three step series, a lobe of cam wheel 377 will engage and restore follower 378.

Quotient registration

To initiate the program of operation, push-pull link 354 (FIGS. 4, 8) is released, upon counterclockwise movement of lever 347, to move forwardly under the urge of spring 356 to engage roller 357r of follower 357 with a low part of cam wheel 358. This will operate ram 345 (FIG. 2) to engage shift clutch 53. Furthermore, a nose 252n of a slide 252 is moved to position to hold clutch 53 engaged. In the operation of clutch 53, a shift direction control shuttle 260 will be operated to adjust the shifting mechanism to shift carriage 27 (FIGS. 1, 3) toward the left.

During the first shift cycle of clutch 53, program shaft 352 will be given its first step of movement. Ram 345 therefore will be powered to the rear toward position to engage registration clutch 55, and digital actuators 26 will be set for substractive registration in dividend register 6 whereas the counting means will be enabled for additive registration in quotient register 9. Ram 345 however will be arrested in intermediate position by a shoulder 345s engaging a lug 341b of a raised slide 341 and thus spring 355 will be charged as link 354 moves rearwardly. This operation of ram 345 would cause disengagement of shift clutch 53 but for the holding operation of nose 252n of slide 252.

Shift clutch 53 will remain engaged until slide 341 is restored downwardly upon movement of carriage 27 into left end position. Downward movement of slide 341 will restore slide 252 so that clutch 53 is disengaged at the end of the current cycle and will release ram 345 which will be moved rearwardly by spring 355 to engage registration clutch 55 thereby initiating quotient registration. Furthermore, the restoring movement of slide 341 will effect adjustment of shift direction control shuttle 260 for subsequent right shift operation of the shifting mechanism upon operation of shift clutch 53.

Subtractive registration will continue until an overdraft occurs. During the terminal part of the overdraft cycle and the idle phase of the first part of the next cycle, program shaft 352 will be given its second step thereby setting the controls as described to reverse the sign of registration in the dividend and quotient registers to correct the overdraft during the next cycle. During the tens transfer phase of the corrective cycle, the program shaft will be given its third step to effect engagement of shift clutch 53 and disengagement of registration clutch 55 at the end of the corrective cycle. During the last part of the shift cycle, the program shaft will be given a step of movement to effect engagement of registration clutch 55, to change the sign of registration and to disengage clutch 53 at the end of a single shift cycle. This accordingly begins another sequence of subtract, add and shift operations which sequence of operations will continue until carriage 27 is shifted into normal right end position.

When carriage 27 is shifted to right end position, lever 347 will be restored clockwise. Disc 348 therefore will be released and restored by spring 350 to the left. Also shuttle 260 will be restored to left shift controlling position.

When lever 347 is restored clockwise, pin 347p will be removed from restraining engagement with slide 266 which, if moved forwardly, would reengage the machine main clutch for the quotient printing cycle. Means, however, comprising follower 378 is provided to prevent this operation from occurring until a quotient digit is registered with carriage 27 in right end position.

It will be recalled that when program shaft 352 is given its first step in each sequence of operations, a hook end 378h is moved to a position in front of an ear 266e of slide 266. Therefore when carriage 27 is shifted to right end position, slide 266 will be restrained in rear position by hook end 378h. The program will continue until the end of the corrective registering cycle of clutch 55. Near the end of this cycle, ram 345 will be powered forwardly by spring 356, as described, toward position to engage shift clutch 53 but will be arrested in intermediate position by lug 353a of crank 353 (FIGS. 4, 8) engaging stop lug 347s of lever 347. Therefore both shift clutch 53 and registration clutch 55 will be disengaged and quotient registration will be terminated.

When program shaft 352 is given its third step near the end of the corrective registering cycle, cam wheel 377 will restore follower 378 clockwise thereby removing hook end 378h from in front of ear 266e of slide 266 which will be moved forwardly by spring 266s to reengage the main clutch for a quotient printing operation. This will be followed by another cycle of the main clutch for printing the remainder and then the machine will be brought to rest with all of the parts in normal position.

Superseding program control means

The operator may inadvertently depress the divide equals key and initiate a program of division without having entered a divisor in the machine. In such instance, an overdraft would not occur and the machine would "run wild," i.e., digital actuators 26 (FIG. 1) would continue to run subtractively until the machine is disconnected from the power source. Means therefore is provided to supersede the normally operable division control means to continue the program of subtract, add and shift operations until the program is terminated upon movement of actuator carriage 27 into normal right end position.

Figure 6:
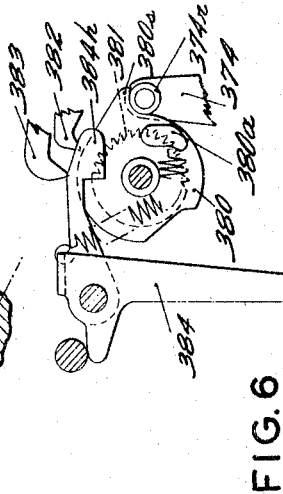
FIG. 6 is a fragmentary detail right side view of the superseding program control devices.

The superseding means includes a cam wheel 380 (FIGS. 4, 6, 8) which is normally spring held clockwise with a shoulder 380s engaging a roller 374r at the end of an upstanding arm of previously noted bell crank 374 which is spring biased counterclockwise. In the normal operation of the division means, roller 374r will remain engaged with a high part of cam wheel 380 and therefore crank 374 will remain stationary as previously described.

Cam wheel 380 is fixed for rotation with a ratchet wheel 381 which is controlled by a feed pawl 382 and a holding pawl 383. Holding pawl 383 is integral with the front arm of the cam follower comprising previously described lever 378. Feed pawl 382 is slidably supported at its front end by holding pawl 383 and extends to the rear where it is eccentrically mounted on shaft 285 which, as previously described, is driven by registration clutch 55.

During the first step of program shaft 352 upon operation of shift clutch 53, as described, follower 378 will be rocked counterclockwise thereby lowering pawls 382, 383 into engagement with ratchet wheel 381. Therefore during each cycle of clutch 55 in the registration of a quotient digit, pawl 382 will be reciprocated to step ratchet wheel 381 and cam wheel 380 one step counterclockwise.

In the normal operation of the machine, an overdraft will occur with a maximum of ten subtractions of the divisor from the dividend in registration of a quotient digit. During the additive corrective cycle, program shaft 352 will be given its third and final step in a sequence of operations thereby restoring follower 378 and pawls 382, 383. Cam wheel 380 and ratchet wheel 381 therefore will be released and restored clockwise.

During the above-described normal operation of the division control means, roller 374r will ride the high part of cam wheel 380 and bell crank 374 will remain stationary as noted. However, if an overdraft does not occur during the tenth cycle, the eleventh subtractive cycle will be effective to rotate the high part of cam wheel 380 from engagement with roller 374r, and therefore crank 374 will be rocked counterclockwise to engage roller 374r with a low part of the cam wheel.

When crank 374 is rocked counterclockwise, the front end of arm 373 will be raised with pin 373p acting as a fulcrum by engagement with the rim of highest order register wheel 25. As a result, the rear end of arm 373 will be lowered from nose 372n of rocker 372 which will be rocked, in the same manner as described in an overdraft, to release disc 371 for adjustment to enable tooth 371t. Accordingly, program shaft 352 will be operated to continue the sequence of operations. It will be noted that the eleventh subtractive cycle will effect registration of the digit "1" in quotient register 9. However the following corrective twelfth cycle will remove the incorrect quotient digit "1."

When cam wheel 380 and ratchet wheel 381 are advanced during the above noted twelfth cycle, latch means is operable to prevent said wheels from being restored when pawls 382, 383 are restored at the end of each sequence of operations of cam shaft 352. Therefore disc 371 will not be restored, and the continuing sequence of subtract, add, shift operations will include each only a single subtract cycle. Therefore all orders of quotient register 9 will stand at "0" upon conclusion of the registering operations with carriage 27 in normal right end position.

The latch means includes a level 384 (FIG. 6) spring urged clockwise against a limit stop and having a horizontal arm terminating in a hook end 384h. When cam wheel 380 is stepped to its twelfth position, a boss 380a on the cam wheel will engage and pass beneath hook end 384h which will be raised and then will drop to the rear of boss 380a. Cam wheel 380 and ratchet wheel 381 will therefore be restrained from clockwise return movement.

Because disc 371 is not restored as in the normal operation of the program means, tooth 371t will be in the path of a lobe of cam wheel 370 (FIGS. 7, 8) when program shaft 352 is stepped during operation of shift clutch 53. In this operation, a cam wing 370c will pass in front and engage tooth 371t to cam disc 371 rearwardly. Then when the lobe of cam wheel 370 passes beyond tooth 371t, spring 369 (FIG. 5) will again move disc 371 forwardly to locate the tooth in the plane of the cam lobes.

Means is operable to release latch lever 384 in the quotient printing operation of the machine main clutch. The releasing means includes a cam 385 on shaft 42 driven by the main clutch. A cam follower comprising a lever 386 is spring urged clockwise into engagement with cam 385. A link 387 extends rearwardly from lever 386 and has pivotal connection with one end of a lever 388. During operation of the main clutch, cam 385 will rock lever 386 counterclockwise to move link 387 forwardly and rock lever 388 clockwise. Clockwise movement of lever 388 will engage an arm thereof with a depending arm of latch lever 384 thereby rocking said lever counterclockwise to lift hook end 384h from engagement with boss 380a thereby releasing cam wheel 380 and ratchet wheel 381.

I claim:
1. In a motor driven calculating machine:
means for controlling said machine to perform a program of operations including a repeated sequence of different operations;
said program control means including
normally disabled means for terminating a given operation of each sequence and initiating the next operation;
a first means operable in the performance of said given operation for enabling said normally disabled means;
a second means operable in the performance of said given operation and normally superseded in operation by said first means for enabling said normally disabled means; and
means alternately operable to enable and to disable said second means.

2. The invention according to claim 1 wherein:
said calculating machine includes cyclically operable means;
said given operation includes plural cycle operation of said cyclically operable means; and
said second means is operable in response to a given number of cycles of said cyclically operable means.

3. The invention according to claim 2 wherein:
said second means includes
a device adapted to be advanced from a normal position,
a spring for uging said device to normal position,
drive means driven in time with said cyclically operable means to advance said device incrementally against the tension of said spring, means alternately operable to engage and to disengage said drive means, and
means for enabling said normally disabled means upon a given advance of said device.

4. The invention according to claim 3 wherein:
said drive means is engaged and disengaged respectively prior to and subsequent to said given operation.

5. The invention according to claim 4 wherein:
upon said given advance of said device, latch means is provided to prevent retraction of said device by said spring upon disengagement of said drive means.

6. In a motor driven calculating machine having a register,
cyclically operable digital actuators for said register,
a carriage for effecting ordinal shift between said register and actuators, and
means for shifting said carriage;
means for controlling a program of operations including a repeated sequence of operations of said actuators and said carriage shifting means;
said program control means including
normally disabled means for terminating a given operation of each sequence and initiating the next operation,
a first means operable in the performance of said given operation for enabling said normally disabled means,
a second means operable in the performance of said given operation and normally superseded in operation by said first means for enabling said normally disabled means; and
means alternately operable to enable and to disable said second means.

7. The invention according to claim 6 wherein:
said given operation includes plural cycle operation of said actuators;
said first means for enabling said normally disabled means includes said register; and
said second means includes means operable in time with said actuators and operable after a given number of cycles thereof.

8. The invention according to claim 7 wherein:
said actuators are operable additively or subtractively;
said first means for enabling said normally disabled means includes means operable upon change in sign of said register; and
said normally disabled means comprises means operable to change the operation of said actuators from one sign registering operation to the other.

9. The invention according to claim 8 wherein:
said second means includes
a device adapted to be advanced from a normal position,
a spring for urging said device to normal position,
drive means driven in time with said actuators to advance said device incrementally against the tension of said spring, and
means for enabling said normally disabled means upon a given advance of said device.

10. The invention according to claim 9 wherein:
means is provided for disengaging said drive means upon operation of said shifting means and engaging said drive means upon operation of said actuators.

11. The invention according to claim 10 wherein:
upon said given advance of said device, latch means is provided to prevent retraction of said device by said spring upon disengagement of said drive means.

References Cited by the Examiner
UNITED STATES PATENTS

| | | | |
|---|---|---|---|
| 2,022,103 | 11/1935 | Avery et al. | 235—63 |
| 2,546,893 | 3/1951 | Hilder | 235—62 |
| 2,572,922 | 10/1951 | Gang | 235—62 X |
| 2,872,115 | 2/1959 | Ellerbeck | 235—63 |
| 2,905,382 | 9/1959 | Carnacina | 235—60 |
| 2,947,476 | 8/1960 | Gang | 235—63 |
| 3,104,812 | 9/1963 | Lagomarsino | 235—63 |

LOUIS J. CAPOZI, *Primary Examiner.*

STEPHEN J. TOMSKY, *Examiner.*

UNITED STATES PATENT OFFICE
CERTIFICATE OF CORRECTION

Patent No. 3,263,917                        August 2, 1966

Herman Gang

It is hereby certified that error appears in the above numbered patent requiring correction and that the said Letters Patent should read as corrected below.

Column 3, line 45, for "discribed" read -- described --; line 67, after "the" insert -- driven --; column 5, line 6, strike out "the"; column 7, line 51, for "level" read -- lever --; column 8, line 35, for "uging" read -- urging --.

Signed and sealed this 18th day of June 1968.

(SEAL)
Attest:

Edward M. Fletcher, Jr.
Attesting Officer

EDWARD J. BRENNER
Commissioner of Patents